(12) United States Patent
Kaifu et al.

(10) Patent No.: US 7,718,752 B2
(45) Date of Patent: May 18, 2010

(54) PROCESS FOR PRODUCING RESORCINOL-FORMALIN RESIN

(75) Inventors: Nobuo Kaifu, Kanagawa (JP); Hiroshi Nakaoka, Kanagawa (JP); Hisatoshi Koinuma, Kanagawa (JP)

(73) Assignee: Hodogaya Chemical Co., Ltd., Kawasaki-shi (JP)

( * ) Notice: Subject to any disclaimer, the term of this patent is extended or adjusted under 35 U.S.C. 154(b) by 0 days.

(21) Appl. No.: 10/574,774

(22) PCT Filed: Oct. 6, 2004

(86) PCT No.: PCT/JP2004/015095

§ 371 (c)(1), (2), (4) Date: May 1, 2007

(87) PCT Pub. No.: WO2005/035611

PCT Pub. Date: Apr. 21, 2005

(65) Prior Publication Data

US 2007/0225462 A1 Sep. 27, 2007

(30) Foreign Application Priority Data

Oct. 7, 2003 (JP) .............................. 2003-348496

(51) Int. Cl.
*C08G 8/04* (2006.01)
*C08G 14/02* (2006.01)
*C08G 8/00* (2006.01)

(52) U.S. Cl. ...................... 528/137; 528/129; 528/155

(58) Field of Classification Search ................. 528/129, 528/219, 137, 155

See application file for complete search history.

(56) References Cited

U.S. PATENT DOCUMENTS 2,385,370 A * 9/1945 Norton ....................... 428/526

(Continued)

FOREIGN PATENT DOCUMENTS

JP 50-109993 8/1975

(Continued)

OTHER PUBLICATIONS

Machine Translation of JP 2003-277308.*

(Continued)

*Primary Examiner*—Mark Eashoo
*Assistant Examiner*—Liam J Heincer
(74) *Attorney, Agent, or Firm*—Oblon, Spivak, McClelland, Maier & Neustadt, L.L.P.

(57) ABSTRACT

A process for producing a resorcinol-formalin resin containing no salts, having a moderate flowability when transformed into an aqueous solution, and having a reduced content of resorcinol monomer and a reduced content of resorcinol-formalin resin of resorcinol pentanuclear or higher nuclear bodies, the whole steps including an one-stage reaction and liquid-liquid distribution being conducted in the same reactor, which comprises adding resorcinol, an inorganic salt, and an organic solvent having a solubility parameter of 7.0 to 12.5 to a water solvent, stirring the mixture to give a two-phase system containing no remaining solid matter, adding an acid catalyst, adding formalin dropwise into the reaction system to cause a liquid-liquid heterogeneous reaction to proceed, removing the aqueous layer, adding an organic solvent and water to the reaction product layer, the amount of the water being half of the amount of the organic solvent, stirring the resulting mixture, allowing it to stand, and then removing the aqueous layer to obtain the resorcinol-formalin resin.

21 Claims, 3 Drawing Sheets

U.S. PATENT DOCUMENTS

| | | | | |
|---|---|---|---|---|
| 2,490,927 A | * | 12/1949 | Spahr et al. | 528/129 |
| 2,915,560 A | * | 12/1959 | Klein et al. | 568/618 |
| 3,133,034 A | * | 5/1964 | St Clair et al. | 524/841 |
| 3,238,158 A | * | 3/1966 | Conca et al. | 524/16 |
| 3,328,354 A | * | 6/1967 | Dietrick | 526/59 |
| 3,410,818 A | * | 11/1968 | Yurcick et al. | 524/510 |
| 3,814,713 A | * | 6/1974 | Honda et al. | 524/510 |
| 3,929,695 A | * | 12/1975 | Murata et al. | 527/403 |
| 4,376,854 A | * | 3/1983 | Yamaguchi et al. | 528/137 |
| 4,433,126 A | * | 2/1984 | Hsu et al. | 527/105 |
| 4,876,324 A | * | 10/1989 | Nakano et al. | 528/142 |
| 4,877,859 A | * | 10/1989 | Tamaru et al. | 528/129 |
| 4,997,804 A | * | 3/1991 | Pekala | 502/418 |
| 5,034,497 A | * | 7/1991 | Waitkus | 528/129 |
| 5,075,413 A | * | 12/1991 | Dailey, Jr. | 528/129 |
| 5,075,414 A | * | 12/1991 | Dailey, Jr. | 528/129 |
| 5,368,928 A | * | 11/1994 | Okamura et al. | 428/295.1 |
| 5,612,142 A | * | 3/1997 | Lewis | 428/528 |
| 5,672,463 A | * | 9/1997 | Hozumi et al. | 430/281.1 |
| 5,847,058 A | * | 12/1998 | Teodorczyk | 525/480 |
| 5,936,056 A | * | 8/1999 | Durairaj et al. | 528/96 |
| 5,945,500 A | * | 8/1999 | Durairaj et al. | 528/96 |
| 6,472,457 B1 | * | 10/2002 | Durairaj et al. | 524/424 |
| 6,541,576 B1 | * | 4/2003 | Phillips et al. | 525/495 |
| 7,196,156 B2 | * | 3/2007 | Durairaj et al. | 528/129 |
| 2004/0116647 A1 | * | 6/2004 | Swedo | 528/145 |
| 2006/0241276 A1 | * | 10/2006 | Inatomi et al. | 528/129 |

FOREIGN PATENT DOCUMENTS

| | | | |
|---|---|---|---|
| JP | 51-132228 | | 11/1976 |
| JP | 57-143316 | | 9/1982 |
| JP | 57143316 A | * | 9/1982 |
| JP | 60-72972 | | 4/1985 |
| JP | 2-222409 | | 9/1990 |
| JP | 2001-55425 | | 2/2001 |
| JP | 2003-277308 | | 10/2003 |
| WO | WO 91/11475 | | 8/1991 |

OTHER PUBLICATIONS

Michinori Ohki, et al., "Solubility", Oct. 1, 1994, 1 cover page and pp. 1468-1469.
U.S. Appl. No. 11/814,521, filed Jul. 23, 2007, Kaifu et al.
U.S. Appl. No. 12/443,489, filed Mar. 30, 2009, Kaifu et al.

* cited by examiner

PROCESS FOR PRODUCING RESORCINOL-FORMALIN RESIN

TECHNICAL FIELD

The present invention relates to a process for producing a resorcinol-formalin resin having a reduced content of resorcinol monomer and a reduced content of resorcinol-formalin resin of resorcinol pentanuclear or higher nuclear bodies by controlling the molecular weight of the resorcinol-formalin resin.

BACKGROUND ART

Hitherto, since resorcinol-formalin resins have been used for adhesives, plywood, glued laminated timber, surface coating agents, and the like owing to their fast curing rate and, in particular, they are used as tire adhesives and rubber horse adhesives owing to their excellent adhesiveness to rubber and fiber (see, for example, JP-B-48-12185, JP-A-4-148920, JP-A-6-100850, and JP-A-2000-178849).

In the case that a resorcinol-formalin resin is used as an adhesive, it is required that the resorcinol-formalin resin has a sufficient flowability and, when a solvent coexists, the resin is homogeneously dissolved therein. When the flowability is focused on, it is empirically known that a sufficient flowability is obtained by reducing the composition ratio of resorcinol pentanuclear or higher nuclear bodies among the constitutive components of a polycondensate. It has been considered that the resorcinol pentanuclear or higher nuclear bodies contain a high ratio of three-dimensional structures and hence the flowability is lost. Moreover, it is also possible to dilute the resin by an organic solvent in order to impart the flowability but the use of the organic solvent is not preferable since the use may possibly result in deteriorated working environment and lowering of adhesiveness. There is a method of dispersing the resin in water by the action of an anionic surfactant without using the organic solvent (see, for example, JP-A-57-167342) but there still remains an anxiety of long-term stability of the resulting water dispersion system.

As mentioned above, it is known that a sufficient flowability is obtained in the case that the solvent is water by lowering the composition ratio of resorcinol pentanuclear or higher nuclear bodies among the constitutive components of the polyconcensate. However, the case that the reaction conditions are set mild so as to reduce the composition ratio of resorcinol pentanuclear or higher nuclear bodies only results in the shift of the molecular weight distribution of the product to a low-molecular-weight side and usually, the concentration of unreacted resorcinol (resorcinol monoclear body) increases. When the concentration of resorcinol increases, there is a possibility that resorcinol is sublimated at the use as an adhesive to deteriorate working environment and further to lower adhesiveness, so that the case is not preferred. When 0.6 mol of formaldehyde is reacted with 1 mol of resorcinol, about 33% by weight of unreacted resorcinol is contained after the completion of the reaction and when 0.8 mol of formaldehyde is reacted, about 20% by weight of unreacted resorcinol is contained. Therefore, in order to reduce the amount of unreacted resorcinol to 15% by weight, it has been reported that resorcinol is removed by sublimation under reduced pressure of 0.05 mmHg at 130° C. so as to reduce the content of unreacted resorcinol (see, for example, JP-B-54-932). Moreover, it has been reported that the content of unreacted resorcinol is reduced to 5.5% by using methyl isobutyl ketone as a solvent and water as an extracting agent by means of a continuous extractor (see, for example, JP-B-49-14550).

However, these processes are industrially disadvantageous since vacuum distillation is required after the completion of the reaction or a long-time operation is required using the continuous extractor.

To the contrary, when severer reaction conditions are adopted in order to lower the concentration of unreacted resorcinol, resorcinol polynuclear bodies of pentanuclear or higher nuclear bodies are formed in a large amount and hence the case is not preferred. Since the reaction is conducted in an aqueous system, it may be possible to use a method of adding a high concentration of a salt after the completion of the reaction to lower the solubility of the polymeric components and removing them after their precipitation. However, this method requires further incorporation of the salting-out step and hence is disadvantageous. In addition, there is a fear of lowered adhesiveness owing to the remaining inorganic salt or corrosion of substrate to be adhered attributable to the inorganic salt, so that the method is not practiced. A means for achieving no increase in the composition ratio of heptanuclear or higher nuclear bodies even in a one-stage reaction without incorporating the salting-out step is disclosed (see, for example, JP-2003-277308). It is a method of coexisting a large amount of a salt in the reaction system in order to reduce the solubility of the resorcinol polynuclear bodies. In this method, since the resorcinol polynuclear bodies precipitated from the aqueous phase form a gummy matter, even resorcinol, resorcinol binuclear bodies, and resorcinol trinuclear bodies are incorporated into the gummy matter and, as a result, a decrease in the reaction rate is invited, which results in a lengthened reaction time. In the industrial production, the formation of a gummy matter in a long-term reaction induces discontinuation of stirring, choking of liquid transferring system, and the like, so that it is difficult to adopt the method.

DISCLOSURE OF THE INVENTION

An object of the invention is to provide a process for producing a resorcinol-formalin resin containing no salts and having a moderate flowability when transformed into an aqueous solution, which is capable of reducing both of the content of resorcinol monomer and the content of resorcinol-formalin resin of resorcinol pentanuclear or higher nuclear bodies in a one-stage reaction.

A resorcinol-formalin resin is soluble in water and also soluble in part of organic solvents. Thus, since the solubility of the resin is not one-sided to either of water or an organic solvent, it is difficult to conceive an idea of utilization of an organic solvent, e.g., liquid-liquid distribution. However, in order to solve the above problems, the present inventors have focused on the solubility properties (solubility parameter) of an organic solvent and studied the reaction between resorcinol and formalin from a variety of viewpoints. As a result, they have found that both of the content of resorcinol monomer and the content of resorcinol-formalin resin of resorcinol pentanuclear or higher nuclear bodies can be reduced at the same time by adopting a liquid-liquid heterogeneous reaction using a specific range of organic solvents, and thus they have accomplished the invention.

Namely, the invention relates to a process for producing a resorcinol-formalin resin containing no inorganic salts and having a reduced content of resorcinol monomer and a reduced content of resorcinol-formalin resin of resorcinol pentanuclear or higher nuclear bodies, the whole steps including an one-stage reaction and liquid-liquid distribution being conducted in the same reactor, which comprises:

adding, to a water solvent, resorcinol (A) in an amount of 20 to 150 parts by weight relative to 100 parts by weight of water, an inorganic salt (B) in an amount of 20 to 80 parts by weight relative to 100 parts by weight of water, and an organic solvent (C) having a solubility parameter of 7.0 to 12.5 and capable of dissolving the resorcinol-formalin resin in an amount of 10 to 200 parts by weight relative to 100 parts by weight of resorcinol (A);

stirring the mixture at a liquid temperature not higher than the boiling point of the organic solvent (C) to give a two-phase system containing no remaining solid matter;

adding a catalytic amount of an organic acid or inorganic acid (D);

adding 1 to 40% formalin (E) dropwise in a molar ratio of formaldehyde/resorcinol of 0.3 to 0.8 under stirring over a period of 1 to 300 minutes while maintaining the reaction system at 0 to 60° C.;

stirring the mixture for further 10 to 60 minutes after the completion of the dropwise addition to cause a liquid-liquid heterogeneous reaction to proceed;

allowing the reaction system to stand while maintaining it at the temperature of the reaction to separate it into two layers;

removing the aqueous layer;

adding an organic solvent (C) in an amount of 1 to 5 equivalents to the amount of the reaction product to the reaction product layer which is an organic solvent layer to effect dilution;

adding water to the reaction product layer in an amount which is half of the amount of the organic solvent;

stirring the reaction system while maintaining its temperature to be not higher than the boiling point;

separating it into two layers after allowing it to stand; and then removing the aqueous layer to obtain the resorcinol-formalin resin.

Moreover, the invention also relates to the following production processes:

The process for producing a resorcinol-formalin resin containing no inorganic salts and having a reduced content of resorcinol monomer and a reduced content of resorcinol-formalin resin of resorcinol pentanuclear or higher nuclear bodies according to the above, the whole steps including an one-stage reaction and liquid-liquid distribution being conducted in the same reactor, wherein the 1 to 40% formalin (E) is intermittently added dropwise in a molar ratio of formaldehyde/resorcinol of 0.3 to 0.8 under stirring over a period of 20 to 300 minutes;

The process for producing a resorcinol-formalin resin containing no inorganic salts and having a reduced content of resorcinol monomer and a reduced content of resorcinol-formalin resin of resorcinol pentanuclear or higher nuclear bodies according to the above, the whole steps including an one-stage reaction and liquid-liquid distribution being conducted in the same reactor, wherein a peak area corresponding to the resorcinol pentanuclear or higher nuclear bodies is from 30% to 55% relative to the whole peak area and a peak area corresponding to the resorcinol monomer is from 3% to 9% relative to the whole peak area, the peak areas being obtained by gel permeation chromatographic analysis of the above resorcinol-formalin resin;

The process for producing a resorcinol-formalin resin containing no inorganic salts and having a reduced content of resorcinol monomer and a reduced content of resorcinol-formalin resin of resorcinol pentanuclear or higher nuclear bodies according to the above, the whole steps including an one-stage reaction and liquid-liquid distribution being conducted in the same reactor, wherein the organic solvent (C) is an organic solvent having a solubility parameter of 9.0 to 11.0;

The process for producing a resorcinol-formalin resin containing no inorganic salts and having a reduced content of resorcinol monomer and a reduced content of resorcinol-formalin resin of resorcinol pentanuclear or higher nuclear bodies according to the above, the whole steps including an one-stage reaction and liquid-liquid distribution being conducted in the same reactor, wherein the organic solvent (C) is an organic solvent represented by the following general formula [1]:

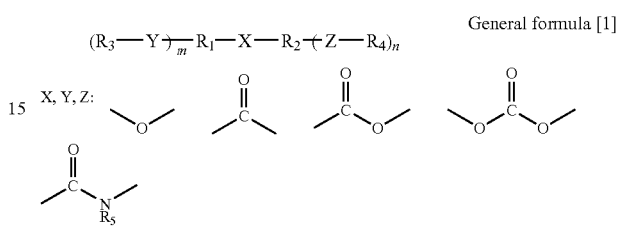

General formula [1]

wherein m represents 0 or 1, n represents 0 or 1, and $R_1$, $R_2$, $R_3$, $R_4$, and $R_5$ each independently represents a methyl group, an ethyl group, an n-propyl group, a 2-propyl group, an n-butyl group, a secondary butyl group, an isobutyl group, or a tertiary butyl group; $R_1$ and $R_2$ may be combined to form a ring when m=n=0, $R_2$ and $R_3$ may be combined to form a ring when m=1 and n=0, and $R_3$ and $R_4$ may be combined to form a ring when m=n=1;

The process for producing a resorcinol-formalin resin containing no inorganic salts and having a reduced content of resorcinol monomer and a reduced content of resorcinol-formalin resin of resorcinol pentanuclear or higher nuclear bodies according to the above, the whole steps including an one-stage reaction and liquid-liquid distribution being conducted in the same reactor, wherein the organic solvent (C) is used as a mixture of two or more thereof;

The process for producing a resorcinol-formalin resin containing no inorganic salts and having a reduced content of resorcinol monomer and a reduced content of resorcinol-formalin resin of resorcinol pentanuclear or higher nuclear bodies according to the above, the whole steps including an one-stage reaction and liquid-liquid distribution being conducted in the same reactor, wherein the inorganic salt (B) is a salt formed from one or two or more cations selected from alkali metals and alkaline earth metals and one or two or more anions selected from a sulfate ion, a nitrate ion, a chlorine ion, a bromine ion, an iodine ion, and a thiocyanate ion;

The process for producing a resorcinol-formalin resin containing no inorganic salts and having a reduced content of resorcinol monomer and a reduced content of resorcinol-formalin resin of resorcinol pentanuclear or higher nuclear bodies according to the above, the whole steps including an one-stage reaction and liquid-liquid distribution being conducted in the same reactor, wherein the inorganic salt (B) is calcium chloride;

The process for producing a resorcinol-formalin resin containing no inorganic salts and having a reduced content of resorcinol monomer and a reduced content of resorcinol-formalin resin of resorcinol pentanuclear or higher nuclear bodies according to the above, the whole steps including an one-stage reaction and liquid-liquid distribution being conducted in the same reactor, wherein the amount of the organic solvent (C) added is from 30 to 100 parts by weight relative to 100 parts by weight of resorcinol (A);

The process for producing a resorcinol-formalin resin containing no inorganic salts and having a reduced content of resorcinol monomer and a reduced content of resorcinol-formalin resin of resorcinol pentanuclear or higher nuclear bodies according to the above, the whole steps including an one-stage reaction and liquid-liquid distribution being conducted in the same reactor, wherein the organic acid or inorganic acid (D) is hydrochloric acid;

The process for producing a resorcinol-formalin resin containing no inorganic salts and having a reduced content of resorcinol monomer and a reduced content of resorcinol-formalin resin of resorcinol pentanuclear or higher nuclear bodies according to the above, the whole steps including an one-stage reaction and liquid-liquid distribution being conducted in the same reactor, wherein the mole number of formaldehyde in the above formalin (E) relative to the mole number of resorcinol (A) is in a molar ratio of formaldehyde/resorcinol of 0.5 to 0.8;

The process for producing a resorcinol-formalin resin containing no inorganic salts and having a reduced content of resorcinol monomer and a reduced content of resorcinol-formalin resin of resorcinol pentanuclear or higher nuclear bodies according to the above, the whole steps including an one-stage reaction and liquid-liquid distribution being conducted in the same reactor, wherein time for the dropwise addition of the formalin (E) is from 20 to 120 minutes;

The process for producing a resorcinol-formalin resin containing no inorganic salts and having a reduced content of resorcinol monomer and a reduced content of resorcinol-formalin resin of resorcinol pentanuclear or higher nuclear bodies according to the above, the whole steps including an one-stage reaction and liquid-liquid distribution being conducted in the same reactor, wherein water is added in an amount of 1 to 10 equivalents by weight to the resorcinol-formalin resin in the organic solvent (C) solution of the resorcinol-formalin resin and the organic solvent (C) is removed by distillation to finally obtain an aqueous resorcinol-formalin resin solution having a reaction product concentration of 30 to 80% and a moderate flowability;

The process for producing a resorcinol-formalin resin containing no inorganic salts and having a reduced content of resorcinol monomer and a reduced content of resorcinol-formalin resin of resorcinol pentanuclear or higher nuclear bodies according to the above, the whole steps including an one-stage reaction and liquid-liquid distribution being conducted in the same reactor, wherein the organic solvent (C) is added to the organic solvent layer obtained by the separation into two layers after allowing to stand and the removal of the aqueous layer, in an amount of 2 to 10 equivalents to the weight of the reaction product to effect dilution, water is removed by distillation at the azeotropic temperature of water and the organic solvent, and then solid matter is removed by filtration after cooling to room temperature.

In addition, the invention relates to the following resorcinol-formalin resin:

A resorcinol-formalin resin containing no inorganic salts and having a reduced content of resorcinol monomer and a reduced content of resorcinol-formalin resin of resorcinol pentanuclear or higher nuclear bodies, produced by a production process where the whole steps including an one-stage reaction and liquid-liquid distribution are conducted in the same reactor, the process comprising:

adding, to a water solvent, resorcinol (A) in an amount of 20 to 150 parts by weight relative to 100 parts by weight of water, an inorganic salt (B) in an amount of 20 to 80 parts by weight relative to 100 parts by weight of water, and an organic solvent (C) having a solubility parameter of 7.0 to 12.5 and capable of dissolving the resorcinol-formalin resin in an amount of 10 to 200 parts by weight relative to 100 parts by weight of resorcinol (A);

stirring the mixture at a liquid temperature not higher than the boiling point of the organic solvent (C) to give a two-phase system containing no remaining solid matter;

adding a catalytic amount of an organic acid or inorganic acid (D);

adding 1 to 40% formalin (E) dropwise in a molar ratio of formaldehyde/resorcinol of 0.3 to 0.8 under stirring over a period of 1 to 300 minutes while maintaining the reaction system at 0 to 60° C.;

stirring the mixture for further 10 to 60 minutes after the completion of the dropwise addition to cause a liquid-liquid heterogeneous reaction to proceed;

allowing the reaction system to stand while maintaining it at the temperature of the reaction to separate it into two layers;

removing the aqueous layer;

adding an organic solvent (C) in an amount of 1 to 5 equivalents to the amount of the reaction product to the reaction product layer which is an organic solvent layer to effect dilution;

adding water to the reaction-product layer in an amount which is half of the amount of the organic solvent;

stirring the reaction system while maintaining its temperature to be not higher than the boiling point;

separating it into two layers after allowing it to stand; and then removing the aqueous layer to obtain the resorcinol-formalin resin;

The resorcinol-formalin resin containing no inorganic salts and having a reduced content of resorcinol monomer and a reduced content of resorcinol-formalin resin of resorcinol pentanuclear or higher nuclear bodies, produced by a production process where the whole steps including an one-stage reaction and liquid-liquid distribution are conducted in the same reactor, according to the above, wherein the 1 to 40% formalin (E) is intermittently added dropwise in a molar ratio of formaldehyde/resorcinol of 0.3 to 0.8 under stirring over a period of 20 to 300 minutes;

The resorcinol-formalin resin containing no inorganic salts and having a reduced content of resorcinol monomer and a reduced content of resorcinol-formalin resin of resorcinol pentanuclear or higher nuclear bodies, produced by a production process where the whole steps including an one-stage reaction and liquid-liquid distribution are conducted in the same reactor, according to the above, wherein a peak area corresponding to the resorcinol pentanuclear or higher nuclear bodies is from 30% to 55% relative to the whole peak area and a peak area corresponding to the resorcinol monomer is from 3% to 9% relative to the whole peak area, the peak areas being obtained by gel permeation chromatographic analysis of the resorcinol-formalin resin;

The resorcinol-formalin resin containing no inorganic salts and having a reduced content of resorcinol monomer and a reduced content of resorcinol-formalin resin of resorcinol pentanuclear or higher nuclear bodies, produced by a production process where the whole steps including an one-stage reaction and liquid-liquid distribution are conducted in the same reactor, according to the above, wherein the organic solvent (C) is an organic solvent having a solubility parameter of 9.0 to 11.0;

The resorcinol-formalin resin containing no inorganic salts and having a reduced content of resorcinol monomer and a reduced content of resorcinol-formalin resin of resorcinol pentanuclear or higher nuclear bodies, produced by a production process where the whole steps including an one-stage reaction and liquid-liquid distribution are conducted in the same reactor, according to the above, wherein the organic solvent (C) is an organic solvent represented by the following general formula [1]:

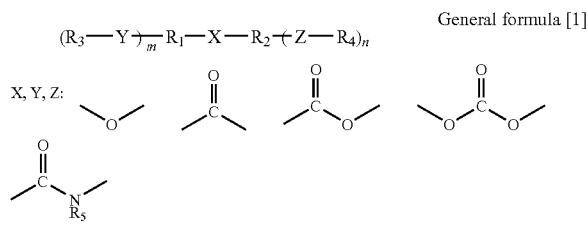

General formula [1]

wherein m represents 0 or 1, n represents 0 or 1, and $R_1$, $R_2$, $R_3$, $R_4$, and $R_5$ each independently represents a methyl group, an ethyl group, an n-propyl group, a 2-propyl group, an n-butyl group, a secondary butyl group, an isobutyl group, or a tertiary butyl group; $R_1$ and $R_2$ may be combined to form a ring when m=n=0, $R_2$ and $R_3$ may be combined to form a ring when m=1 and n=0, and $R_3$ and $R_4$ may be combined to form a ring when m=n=1;

The resorcinol-formalin resin containing no inorganic salts and having a reduced content of resorcinol monomer and a reduced content of resorcinol-formalin resin of resorcinol pentanuclear or higher nuclear bodies, produced by a production process where the whole steps including an one-stage reaction and liquid-liquid distribution are conducted in the same reactor, according to the above, wherein the organic solvent (C) is used as a mixture of two or more thereof;

The resorcinol-formalin resin containing no inorganic salts and having a reduced content of resorcinol monomer and a reduced content of resorcinol-formalin resin of resorcinol pentanuclear or higher nuclear bodies, produced by a production process where the whole steps including an one-stage reaction and liquid-liquid distribution are conducted in the same reactor, according to the above, wherein water is added in an amount of 1 to 10 equivalents by weight to the resorcinol-formalin resin in the organic solvent (C) solution of the resorcinol-formalin resin and the organic solvent (C) is removed by distillation to finally obtain an aqueous resorcinol-formalin resin solution having a reaction product concentration of 30 to 80% and a moderate flowability;

The resorcinol-formalin resin containing no inorganic salts and having a reduced content of resorcinol monomer and a reduced content of resorcinol-formalin resin of resorcinol pentanuclear or higher nuclear bodies, produced by a production process where the whole steps including an one-stage reaction and liquid-liquid distribution are conducted in the same reactor, according to the above, wherein the organic solvent (C) is added to the organic solvent layer obtained by the separation into two layers after allowing to stand and the removal of the aqueous layer, in an amount of 2 to 10 equivalents to the weight of the reaction product to effect dilution, water is removed by distillation at the azeotropic temperature of water and the organic solvent, and then solid matter is removed by filtration after cooling to room temperature.

The process for producing a resorcinol-formalin resin according to the invention is characterized by the adoption of a liquid-liquid heterogeneous reaction. The advantages derived from the adoption of the liquid-liquid heterogeneous reaction are as follows: (1) since the reaction proceeds faster in an aqueous phase and the existing ratio of resorcinol is in favor to the aqueous phase, the amount of unreacted resorcinol can be reduced; (2) the solubility of the resorcinol polynuclear bodies (especially, tetranuclear or higher nuclear bodies wherein three-dimensional structures are present) are rapidly decreased with the progress of the reaction and hence they migrate into an organic phase; furthermore, since the reaction proceeds slower in the organic phase, the formation of resorcinol pentanuclear or higher nuclear bodies are inhibited; (3) since the reaction proceeds in both of the aqueous phase and the organic phase, the reaction time can be shortened; (4) the reaction is completed as an one-stage reaction between resorcinol and formalin and a step for removing the resorcinol polynuclear bodies after the reaction is not necessary, and (5) for the above reasons, the formation of both of unreacted resorcinol and resorcinol polynuclear bodies can be reduced, the reaction time can be shortened, and also the reaction can be completed in a one-stage reaction, so that the process is extremely advantageous in view of the cost.

BEST MODE FOR CARRYING OUT THE INVENTION

Figure 1:
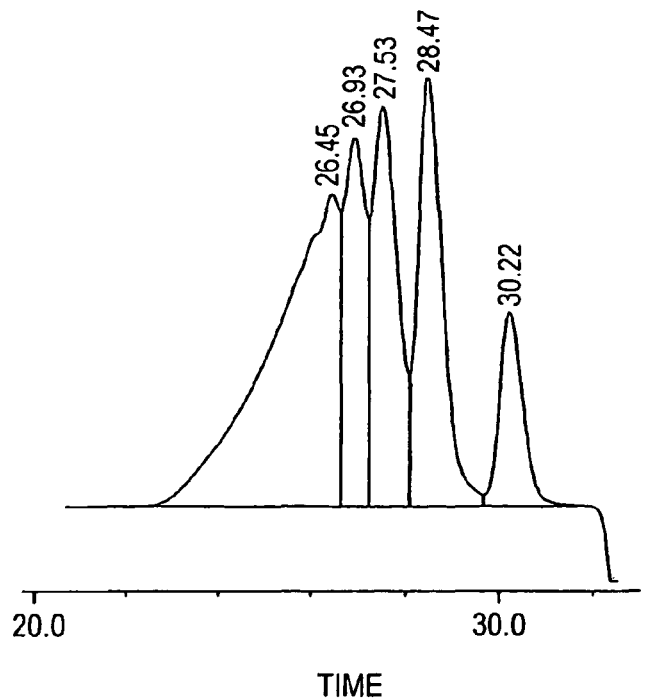
FIG. 1 is the gel permeation chromatogram obtained in Example 1.

As the cation of the inorganic salt (B) used in the process for producing a resorcinol-formalin resin of the invention, there may be mentioned a cation of an alkali metal such as lithium, sodium, potassium, rubidium, or cesium, or an alkaline earth metal such as magnesium, calcium, strontium, or barium. As the anion of the inorganic salt (B), there may be mentioned a sulfate ion, a nitrate ion, a chlorine ion, a bromine ion, an iodine ion, or a thiocyanate ion. Preferably, the salt is calcium chloride.

The above inorganic salt (B) may be used singly or also as a mixture of two or more thereof. The inorganic salt (B) is used in an amount of 20 to 80 parts by weight, preferably 30 to 50 parts by weight relative to 100 parts by weight of water. In any event, the inorganic salt is used within the solubility in water.

The solubility parameter used in the process for producing a resorcinol-formalin resin of the invention is specifically explained in "Solubility Parameters For Film Formes" (Official Digest, October, 1955).

The equation for its calculation using physical constants is as follows:

$$\delta = \{(\Delta H - RH)/V\}^{1/2}$$

$\delta$: solubility parameter
$\Delta H$: latent heat of vaporization
R: gas constant
V: molar volume Since an organic solvent having a solubility parameter of less than 7.0 has small solubility for resorcinol polynuclear bodies, the resorcinol polynuclear bodies precipitate in the form of solids and thus the solvent cannot be used in the process of the invention. Moreover, since an organic solvent having a solubility parameter exceeding 12.5 well mixes with water, the liquid-liquid heterogeneous reaction, which is one characteristic of the present process, cannot be conducted, so that the solvent cannot be used.

Since an organic solvent having a solubility parameter of 9.0 to 11.0 dissolves resorcinol polynuclear bodies and forms a liquid-liquid heterogeneous system with water, the solvent is preferable as an organic solvent to be used in the process of the invention.

Of the organic solvents (C) defined by a solubility parameter of 7.0 to 12.5, preferred are those represented by the structural formula as a general formula [1]:

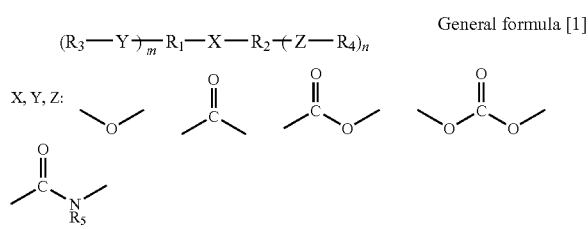

General formula [1]

wherein m represents 0 or 1, n represents 0 or 1, and $R_1$, $R_2$, $R_3$, $R_4$, and $R_5$ each independently represents a methyl group, an ethyl group, an n-propyl group, a 2-propyl group, an n-butyl group, a secondary butyl group, an isobutyl group, or a tertiary butyl group. $R_1$ and $R_2$ may be combined to form a ring when m=n=0, $R_2$ and $R_3$ may be combined to form a ring when m=1 and n=0, and $R_3$ and $R_4$ may be combined to form a ring when m=n=1.

Specific examples of the organic solvent (C) having a solubility parameter of 7.0 to 12.5 to be used in the process for producing a resorcinol-formalin resin of the invention include methyl ethyl ketone, methyl isobutyl ketone, acetone, tetrahydrofuran, diisopropyl ether, dibutyl ether, n-butyl acetate, dimethyl carbonate, diethyl carbonate, and the like, preferably methyl ethyl ketone, acetone, tetrahydrofuran, dimethyl carbonate, diethyl carbonate, and the like, which are organic solvent (C) having a solubility parameter of 9.0 to 11.0. Further preferred is methyl ethyl ketone. Moreover, these organic solvents may be used as a mixture of two or more thereof. The amount thereof to be used is suitably from 10 to 200 parts by weight relative to 100 parts by weight of resorcinol.

As the organic acid or inorganic acid (D) to be used as a catalyst in the process for producing a resorcinol-formalin resin of the invention, there may be mentioned hydrochloric acid, sulfuric acid, phosphoric acid, benzenesulfonic acid, toluenesulufonic acid, and the like. Preferred is hydrochloric acid.

Moreover, in the invention, the step of adding water in an amount of 1 to 10 equivalents by weight to the resorcinol-formalin resin to the organic solvent solution of the resorcinol-formalin resin after complete removal of the inorganic salt, subjecting the resulting mixture to distillation, and removing the organic solvent to finally obtain an aqueous resorcinol-formalin resin solution having a reaction product concentration of 30 to 80%, preferably 40 to 60% and a moderate flowability transforms the resorcinol-formalin resin of the invention into a form easy to use in the next step. In addition, water in an amount of 1 to 10 equivalents by weight to the resorcinol-formalin resin is added but the amount means a water amount that is sufficient for reducing the residual amount of the organic solvent to finally 1% by weight or less by azeotropic distillation. Therefore, it is permissible for the amount to deviate from the amount of 1 to 10 equivalents. In the next step, the following method as described in JP-B-48-12185 is adopted. The adhesive stock solution is preferably used after dilution with water prior to the treatment of fiber materials, films, or the like. The addition of an appropriate amount of a basic substance is conducted for facile dissolution of the adhesive.

As the reaction vessel to be used in the invention, since an acid catalyzed reaction is conducted, a usual apparatus may be used as far as it is acid-resistant. The reaction temperature to be adopted in the invention is desirably not higher than the boiling point of the organic solvent used. Moreover, since it is necessary to dissolve a salt in water in a high concentration, it should be a temperature a certain degree higher than room temperature in order to ensure the solubility. As the reaction temperature, a temperature of 0 to 60° C., preferably 30 to 50° C. is adopted.

The organic solvent to be used in the invention can be redistilled and recycled after separation by distillation. Moreover, the salt to be used in the invention can be recovered and recycled after separation.

The concentration of formaldehyde in the formalin (E) to be used in the invention is from 1 to 40% by weight, preferably 30 to 40% by weight. Moreover, the amount of formalin to be used is an amount so as to be in a molar ratio relative to resorcinol, i.e., formaldehyde/resorcinol, of 0.3 to 0.8, preferably 0.5 to 0.8.

EXAMPLES

The following will describe the invention in detail with reference to Examples.

Example 1

After 133 kg of water, 85 kg of calcium chloride, and 111 kg of resorcinol were placed in a 500 L acid-resistant reaction vessel and dissolved at 50° C., 45 kg of methyl ethyl ketone and 0.45 kg of 35% hydrochloric acid were charged into the reaction vessel. While the reaction system was maintained at 50° C., 53 kg of 37% formalin was added dropwise over a period of 30 minutes and, after the completion of the dropwise addition, the mixture was further stirred for 30 minutes to cause a liquid-liquid heterogeneous reaction to proceed. While maintaining the temperature of the reaction system, it was allowed to stand and separate into two layers, and then an underlying aqueous phase was drawn off. The organic phase was diluted with 200 kg of methyl ethyl ketone and then 100 kg of water was added thereto. Furthermore, while maintaining the same temperature, the reaction system was stirred for 30 minutes and, after allowing to stand, separated into two layers and then the aqueous layer was drawn off to obtain a methyl ethyl ketone solution of a resorcinol-formalin resin.

Then, 200 kg of water was added to the resulting methyl ethyl ketone solution of the resorcinol-formalin resin and distillation was conducted at the azeotropic temperature to remove methyl ethyl ketone and reduce the water content, whereby 263 kg of an objective aqueous resorcinol-formalin resin solution having a solid content of about 50% and a moderate flowability was obtained. The aqueous resorcinol-formalin resin solution having a solid content of about 50% is a resorcinol-formalin resin containing no inorganic salts and reduced contents of the resorcinol monomer and resorcinol pentanuclear and higher nuclear bodies.

The resulting resorcinol-formalin resin was dissolved in tetrahydrofuran and the solution was subjected to gel permeation chromatographic analysis, whereby the distribution of unreacted resorcinol to resorcinol pentanuclear and higher nuclear bodies was measured. The resulting chromatogram is shown in FIG. 1. The calculated ratios of peak areas are shown in Table 1.

The following shows the conditions of the gel permeation chromatographic analysis.

Model for measurement: HLC-8020 manufactured by Tosoh Corporation
Columns: (G-2500)+(G-2500)+(G-4000)
Column temperature: 40° C.
Solvent: tetrahydrofuran
Flow rate: 1 ml/min Example 2

After 1336 g of water, 850 g of calcium chloride, 1107.0 g of resorcinol, and 450 g of methyl ethyl ketone were placed in a 5 L flask made of glass and dissolved at 60° C., 4.5 g of 35% hydrochloric acid was charged into the reaction vessel. While the reaction system was cooled to 50° C. and maintained at 50° C., 490 g of 37% formalin was added dropwise over a period of 45 minutes and, after the completion of the dropwise addition, the mixture was further stirred at 50° C. for 1 hour to cause a liquid-liquid heterogeneous reaction to proceed. Thereafter, 40 g of 37% formalin was added dropwise over a period of 45 minutes and, after the completion of the dropwise addition, the mixture was further stirred at 50° C. for 1 hour to cause a liquid-liquid heterogeneous reaction to proceed. While the reaction system is maintained at the same temperature, it was allowed to stand and separate into two layers, and then an underlying aqueous phase was drawn off. The organic phase was diluted with 1500 g of methyl ethyl ketone and 750 g of water was added thereto. Furthermore, while maintaining the same temperature, the reaction system was stirred for 1 hour and, after allowing to stand, separated into two layers and then the aqueous layer was drawn off to obtain a methyl ethyl ketone solution of a resorcinol-formalin resin.

Then, 2000 g of water was added to the resulting methyl ethyl ketone solution of the resorcinol-formalin resin and distillation was conducted at the azeotropic temperature to remove methyl ethyl ketone and reduce the water content, whereby 2524 g of an objective aqueous resorcinol-formalin resin solution having a solid content of about 50% and a moderate flowability was obtained. The aqueous resorcinol-formalin resin solution having a solid content of about 50% is a resorcinol-formalin resin containing no inorganic salts and reduced contents of the resorcinol monomer and resorcinol pentanuclear and higher nuclear bodies.

Figure 2:
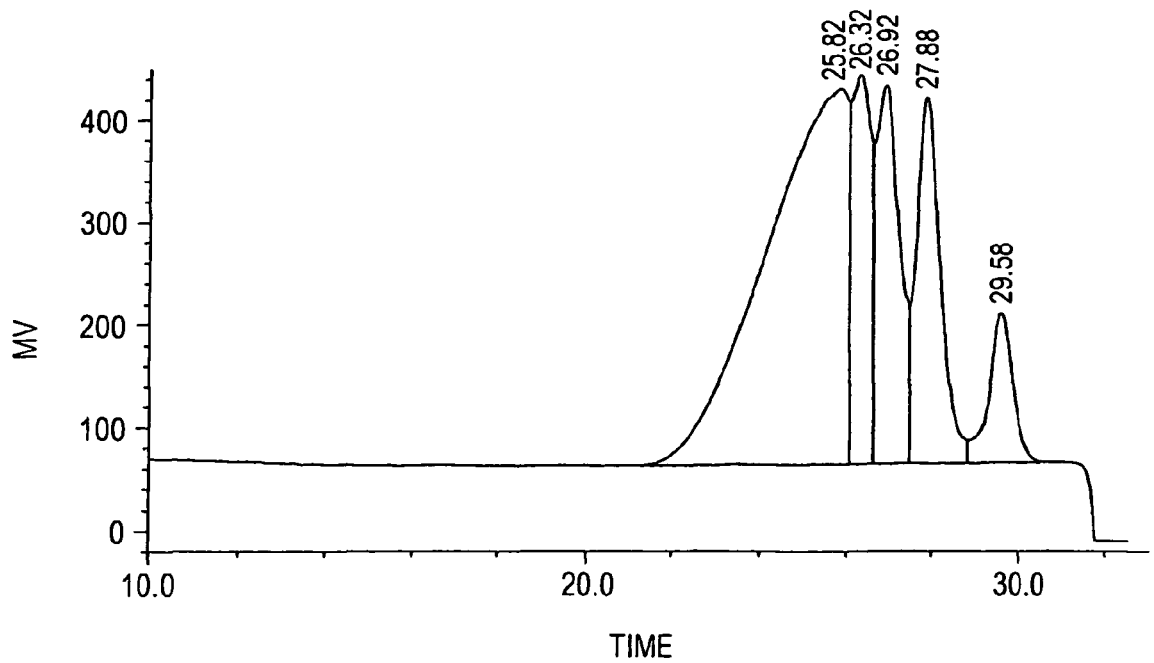
FIG. 2 is the gel permeation chromatogram obtained in Example 2.

The resulting resorcinol-formalin resin was dissolved in tetrahydrofuran and the solution was subjected to gel permeation chromatographic analysis, whereby the distribution of unreacted resorcinol to resorcinol pentanuclear and higher nuclear bodies was measured. The resulting chromatogram is shown in FIG. 2. The calculated ratios of peak areas are shown in Table 1.

Table 1 also shows the analytical results of the reaction solution before the second addition of 37% formalin. The conditions of the gel permeation chromatographic analysis are the same as in Example 1.

Example 3

After 2660 g of water, 1710 g of calcium chloride, 738 g of resorcinol, and 300 g of methyl ethyl ketone were placed in a 5 L flask made of glass and dissolved at 60° C., 9 g of 35% hydrochloric acid was charged into the reaction vessel. While the reaction system was cooled to 50° C. and maintained at 50° C., 326 g of 37% formalin was added dropwise over a period of 45 minutes and, after the completion of the dropwise addition, the mixture was further stirred at 50° C. for 1 hour to cause a liquid-liquid heterogeneous reaction to proceed. Thereafter, 27 g of 37% formalin was added dropwise over a period of 45 minutes and, after the completion of the dropwise addition, the mixture was further stirred at 50° C. for 1 hour to cause a liquid-liquid heterogeneous reaction to proceed. While the reaction system is maintained at the same temperature, it was allowed to stand and separate into two layers, and then an underlying aqueous phase was drawn off. The organic phase was diluted with 1000 g of methyl ethyl ketone and 500 g of water was added thereto. Furthermore, while maintaining the same temperature, the reaction system was stirred for 1 hour and, after allowing to stand, separated into two layers and then the aqueous layer was drawn off to obtain a methyl ethyl ketone solution of a resorcinol-formalin resin. The solution was again diluted with 1000 g of methyl ethyl ketone and distillation was conducted at the azeotropic temperature of water and methyl ethyl ketone to remove water. Then, the mixture was cooled to room temperature and filtrated to obtain a methyl ethyl ketone solution of a resorcinol-formalin resin. The resulting methyl ethyl ketone solution of the resorcinol-formalin resin was again placed in the reaction vessel and, after the addition of eater, distillation was conducted at the azeotropic temperature to remove methyl ethyl ketone and reduce the water content, whereby 1683 g of an objective aqueous resorcinol-formalin resin solution having a solid content of about 50% and a moderate flowability was obtained. The aqueous resorcinol-formalin resin solution having a solid content of about 50% is a resorcinol-formalin resin containing no inorganic salts and reduced contents of the resorcinol monomer and resorcinol pentanuclear and higher nuclear bodies.

Figure 3:
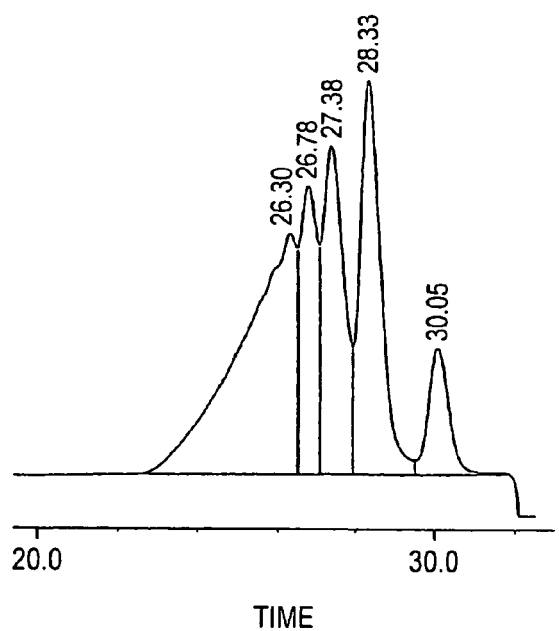
FIG. 3 is the gel permeation chromatogram obtained in Example 3.

The resulting resorcinol-formalin resin was dissolved in tetrahydrofuran and the solution was subjected to gel permeation chromatographic analysis, whereby the distribution of unreacted resorcinol to resorcinol pentanuclear and higher nuclear bodies was measured. The resulting chromatogram is shown in FIG. 3. The calculated ratios of peak areas are shown in Table 1.

Table 1 also shows the analytical results of the reaction solution before the second addition of 37% formalin. The conditions of the gel permeation chromatographic analysis are the same as in Example 1.

Example 4

After 2660 g of water, 1710 g of calcium chloride, 738 g of resorcinol, and 300 g of methyl ethyl ketone were placed in a 5 L flask made of glass and dissolved at 60° C., 9 g of 35% hydrochloric acid was charged into the reaction vessel. While the reaction system was cooled to 50° C. and maintained at 50° C., 353 g of 37% formalin was added dropwise over a period of 45 minutes and, after the completion of the dropwise addition, the mixture was further stirred at 50° C. for 1 hour to cause a liquid-liquid heterogeneous reaction to proceed. While the reaction system is maintained at the same temperature, it was allowed to stand and separate into two layers, and then an underlying aqueous phase was drawn off to obtain a methyl ethyl ketone solution of a resorcinol-formalin resin. The organic phase was diluted with 1000 g of methyl ethyl ketone and 500 g of water was added thereto. Furthermore, while maintaining the same temperature, the reaction system was stirred for 1 hour and, after allowing to stand, separated into two layers and then the aqueous layer was drawn off. The organic phase was again diluted with 1000 g of methyl ethyl ketone and distillation was conducted at the azeotropic temperature of water and methyl ethyl ketone to remove water. Then, the mixture was cooled to room temperature and filtrated to obtain a methyl ethyl ketone solution of a resorcinol-formalin resin.

Water was added to the resulting methyl ethyl ketone solution of the resorcinol-formalin resin and distillation was conducted at the azeotropic temperature to remove methyl ethyl ketone and reduce the water content, whereby 1691 g of an objective aqueous resorcinol-formalin resin solution having a solid content of about 50% was obtained.

Figure 4:
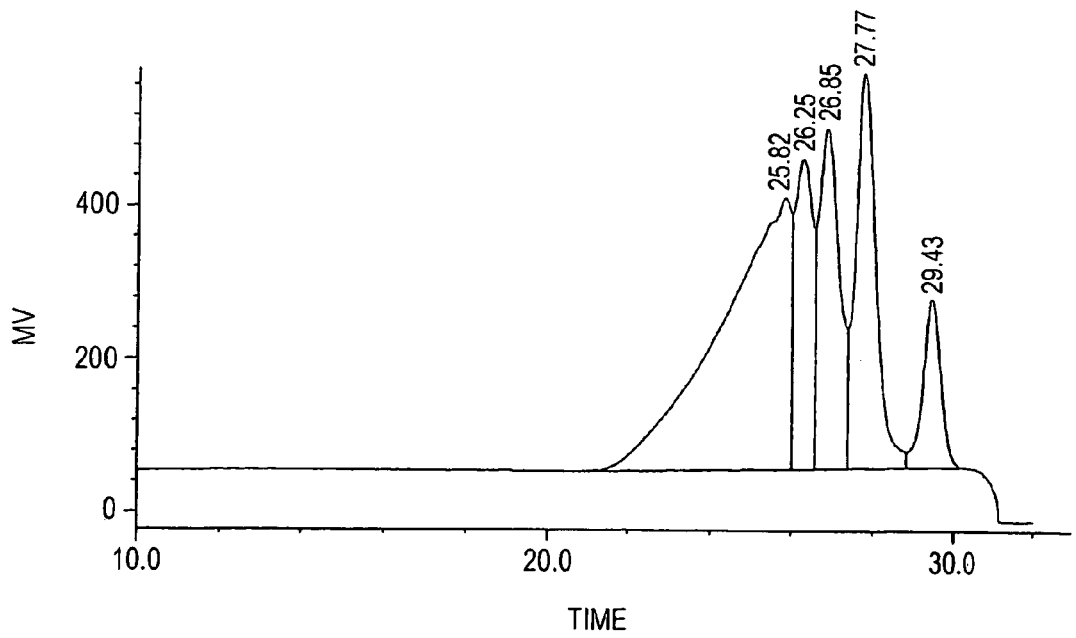
FIG. 4 is the gel permeation chromatogram obtained in Example 4.

The resulting resorcinol-formalin resin was dissolved in tetrahydrofuran and the solution was subjected to gel permeation chromatographic analysis, whereby the distribution of unreacted resorcinol to resorcinol pentanuclear and higher nuclear bodies was measured. The resulting chromatogram is shown in FIG. 4. The calculated ratios of peak areas are shown in Table 1. The conditions of the gel permeation chromatographic analysis are the same as in Example 1.

Example 5

Figure 5:
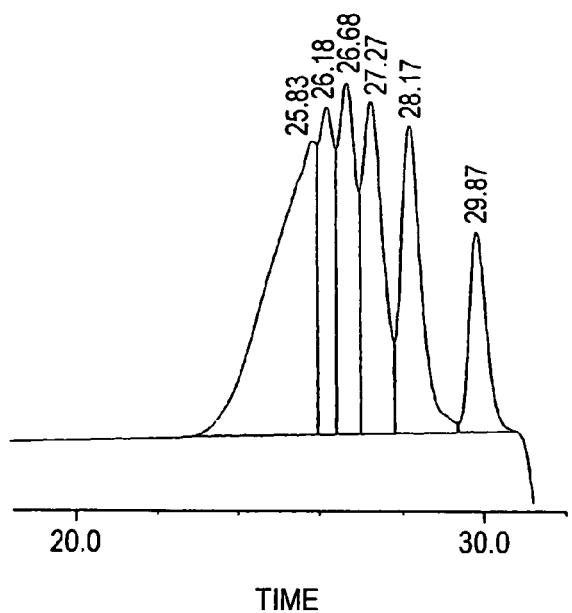
FIG. 5 is the gel permeation chromatogram obtained in Example 5.

While methyl ethyl ketone was used as an organic solvent in Example 1, methyl isobutyl ketone was used in Example 5. Moreover, 53 kg of 37% formalin was added dropwise over a period of 30 minutes in Example 1 but 57 kg of 37% formalin was added dropwise over a period of 30 minutes in Example 5. The other reaction conditions and analytical conditions are the same as in Example 1. An aqueous resorcinol-formalin resin solution having a solid content of about 50% was obtained in an amount of 243 kg. The analytical results are shown in FIG. 5 and Table 1.

Example 6

Figure 6:
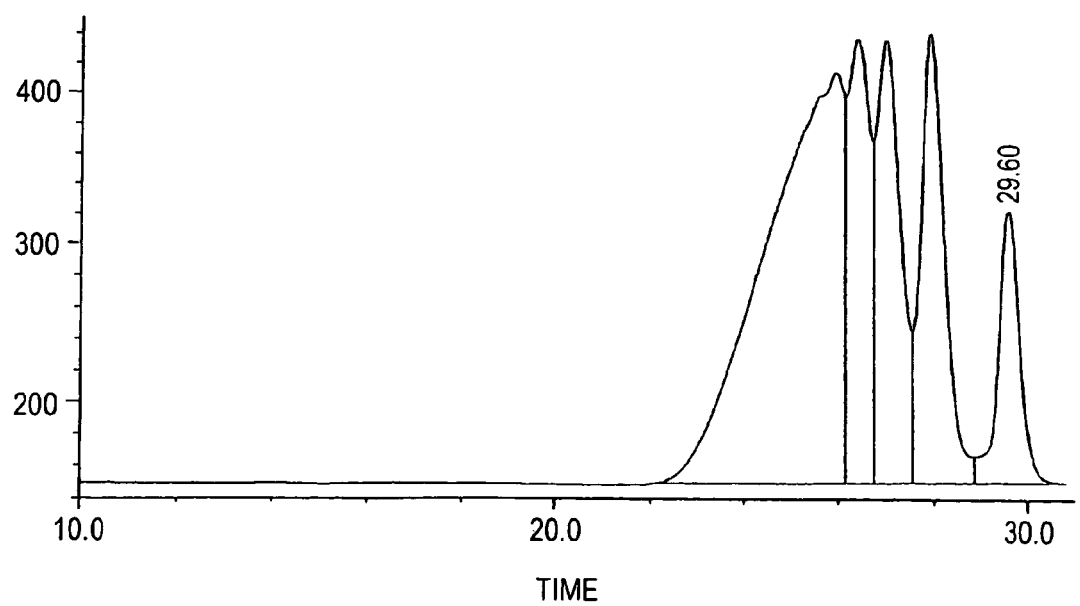
FIG. 6 is the gel permeation chromatogram obtained in Example 6.

Tetrahydrofuran was used as an organic solvent and the amount of 37% formalin added dropwise was 57 kg. The other reaction conditions and analytical conditions are the same as in Example 1. An aqueous resorcinol-formalin resin solution having a solid content of about 50% was obtained in an amount of 227 kg. The analytical results are shown in FIG. 6 and Table 1.

Examples 7 to 11

The solvents used in Examples 7 to 11 were shown in Table 1. The amount of 37% formalin added dropwise was 57 kg. The other reaction conditions and analytical conditions are the same as in Example 1. The analytical results are shown in Table 1.

Comparative Example 1

After 265 g of water, 170 g of calcium chloride, and 63 g of resorcinol were placed in a 2 L three-neck flask and dissolved at 50° C., 0.8 g of 35% hydrochloric acid was charged into the reaction vessel. While the reaction system was maintained at 50° C., 26 g of 37% formalin was added dropwise over a period of 5 hours and, after the completion of the dropwise addition, the mixture was further stirred for 1 hour to cause a solid-liquid heterogeneous reaction to proceed. The formed resorcinol polynuclear bodies formed a gummy matter and entwined the starring bar, and the post-treatment was extremely burdensome. After the aqueous phase was discarded, the gummy matter was washed with 400 g of an aqueous 39% calcium chloride solution. After the washing liquid was removed, the gummy matter was dried under reduced pressure and then dissolved into 240 g of methyl ethyl ketone and, after the insoluble matter was filtrated, the filtrate was again dried under reduced pressure. As compared with the reaction in Examples, an extremely long time was required for the reaction. From the above results, the reaction was judged to be difficult to expand to an industrial scale.

Comparative Example 2

After 150 g of water and 63 g of resorcinol-were placed in a 1 L three-neck flask and dissolved at 50° C., 0.8 g of 35% hydrochloric acid was charged into the reaction vessel. While the reaction system was maintained at 50° C., 26 g of 37% formalin was added dropwise over a period of 5 hours and, after the completion of the dropwise addition, the mixture was further stirred for 1 hour to cause a reaction to proceed. After the aqueous phase was discarded, the reaction product was washed with 400 g of water. After the washing liquid was removed, the product was dried under reduced pressure and then dissolved into 240 g of methyl ethyl ketone and, after the insoluble matter was filtrated, the filtrate was again dried under reduced pressure. It was tried to dissolve the reaction product by adding water thereto but it was impossible to form an aqueous solution. This is attributable to a high content of the resorcinol-formalin resin of pentanuclear or higher nuclear bodies.

TABLE 1

Peak areas (%) on chromatogram of resorcinol-formalin resin

| | Solvent | Peak area percentage (%) | | | | |
|---|---|---|---|---|---|---|
| | | Resorcinol | Resorcinol binuclear body | Resorcinol trinuclear body | Resorcinol tetranuclear body | Resorcinol pentanuclear or higher nuclear bodies |
| Example 1 | MEK | 8.1 | 19.9 | 18.7 | 14.5 | 38.9 |
| Example 2 (before second addition of formalin) | MEK | 9.3 | 16.4 | 16.4 | 15.0 | 42.9 |

TABLE 1-continued

Peak areas (%) on chromatogram of resorcinol-formalin resin

| | | Peak area percentage (%) | | | | |
|---|---|---|---|---|---|---|
| | Solvent | Resorcinol | Resorcinol binuclear body | Resorcinol trinuclear body | Resorcinol tetranuclear body | Resorcinol pentanuclear or higher nuclear bodies |
| Example 2 | MEK | 5.3 | 13.2 | 14.3 | 14.1 | 53.2 |
| Example 3 (before second addition of formalin) | MEK | 8.1 | 19.9 | 18.7 | 14.5 | 38.9 |
| Example 3 | MEK | 5.2 | 19.3 | 18.9 | 14.7 | 42.1 |
| Example 4 | MEK | 7.0 | 19.0 | 16.5 | 13.2 | 44.5 |
| Example 5 | MIBK | 8.3 | 15.7 | 16.6 | 15.0 | 45.1 |
| Example 6 | THF | 8.3 | 15.8 | 16.4 | 15.2 | 44.3 |
| Example 7 | Diisopropyl ether | 7.2 | 16.0 | 16.6 | 15.4 | 44.4 |
| Example 8 | Dibutyl ether | 7.3 | 15.3 | 16.7 | 14.8 | 45.3 |
| Example 9 | n-Butyl acetate | 8.2 | 14.9 | 15.3 | 14.6 | 47.0 |
| Example 10 | Dimethyl carbonate | 7.0 | 13.4 | 13.3 | 12.0 | 54.3 |
| Example 11 | Diethyl carbonate | 8.0 | 12.5 | 13.2 | 11.8 | 54.5 |

While the invention has been described in detail and with reference to specific examples thereof, it will be apparent to one skilled in the art that various changes and modifications can be made therein without departing from the spirit and scope thereof.

The present application is based on Japanese Patent Application No. 2003-348496 filed on Oct. 7, 2003, and the contents are incorporated herein by reference.

INDUSTRIAL APPLICABILITY

The production process of the invention adopts a liquid-liquid heterogeneous reaction and hence can reduce both of the content of resorcinol monomer and the content of resorcinol-formalin resin of resorcinol pentanuclear or higher nuclear bodies. Since the reaction time can be shortened, the reaction can be completed in a one-stage reaction, and the whole steps are conducted in the same reactor, an industrial production is possible and the process is advantageous in view of the cost. Moreover, according to the production process of the invention, it is possible to provide a resorcinol-formalin resin containing no inorganic salts and having a moderate flowability when transformed into an aqueous solution.

Since the resorcinol-formalin resin of the invention contains no inorganic salts, has a moderate flowability, and is excellent in adhesiveness to rubber and fiber, the resin is useful as a tire adhesive and a rubber horse adhesive.

The invention claimed is:

1. A resorcinol-formalin resin containing no inorganic salts, produced by a production process comprising:
   (1) adding, to a water solvent, resorcinol (A) in an amount of 20 to 150 parts by weight relative to 100 parts by weight of water, an inorganic salt (B) in an amount of 20 to 80 parts by weight relative to 100 parts by weight of water, and an organic solvent (C) having a solubility parameter of 7.0 to 12.5 and capable of dissolving the resorcinol-formalin resin in an amount of 10 to 200 parts by weight relative to 100 parts by weight of resorcinol (A), thereby forming a mixture;
   (2) stirring the mixture at a liquid temperature not higher than the boiling point of the organic solvent (C) to give a two-phase system containing no remaining solid matter;
   (3) adding a catalytic amount of an organic acid or inorganic acid (D) to the mixture formed in step (2);
   (4) adding 1 to 40% formalin (E) dropwise to the mixture formed in step (3) in a molar ratio of formaldehyde/resorcinol of 0.3 to 0.8 under stirring over a period of 1 to 300 minutes thereby forming a reaction system, while maintaining the reaction system at 0 to 60° C.;
   (5) stirring the mixture formed in step (4) for further 10 to 60 minutes after the completion of the dropwise addition to cause a liquid-liquid heterogeneous reaction to proceed;
   (6) allowing the reaction system to stand while maintaining it at the temperature of the reaction to separate it into two layers, which are an aqueous layer and a reaction product layer;
   (7) removing the aqueous layer;
   (8) adding an organic solvent (C) in an amount of 1 to 5 equivalents to the amount of the reaction product to the reaction product layer which is an organic solvent layer to effect dilution;
   (9) adding water to the reaction product layer in an amount which is half of the amount of the organic solvent;
   (10) stirring the reaction system after adding of said organic solvent (C) and said water while maintaining its temperature to be not higher than the boiling point;
   (11) separating the reaction system of step (10) into two layers, including an aqueous layer, after allowing the reaction system to stand; and then
   (12) removing the aqueous layer to obtain a resorcinol-formalin resin, wherein said reaction is a one-stage reaction and liquid-liquid distribution is conducted in the same reactor, and wherein the organic solvent (C) is a ketone represented by the following general formula [1]:

General formula [1]

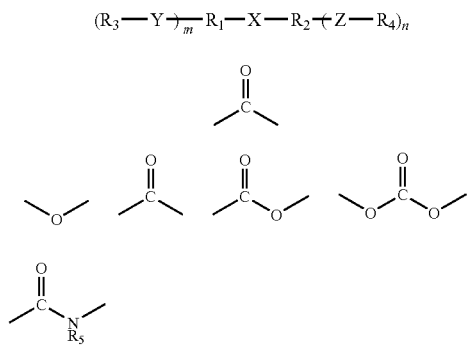

wherein m represents 0 or 1, n represents 0 or 1, and $R_1$, $R_2$, $R_3$, $R_4$, and $R_5$ each independently represents a methyl group, an ethyl group, an n-propyl group, a 2-propyl group, an n-butyl group, a secondary butyl group, an isobutyl group, or a tertiary butyl group; $R_1$ and $R_2$ may be combined to form a ring when m=n=0, $R_2$ and $R_3$ may be combined to form a ring when m=1 and n=0, and $R_3$ and $R_4$ may be combined to form a ring when m=n=1.

2. The resorcinol-formalin resin according to claim 1, wherein the 1 to 40% formalin (E) is intermittently added dropwise in a molar ratio of formaldehyde/resorcinol of 0.3 to 0.8 under stirring over a period of 20 to 300 minutes in step (4).

3. The resorcinol-formalin resin according to any one of claims 1 to 2, wherein a peak area corresponding to resorcinol pentanuclear or higher nuclear bodies present in said resorcinol-formalin resin is from 30% to 55% relative to the whole peak area and a peak area corresponding to the resorcinol monomer is from 3% to 9% relative to the whole peak area, the peak areas being obtained by gel permeation chromatographic analysis of the resorcinol-formalin resin.

4. The resorcinol-formalin resin according to claim 1, wherein the organic solvent (C) is an organic solvent having a solubility parameter of 9.0 to 11.0.

5. The resorcinol-formalin resin according to claim 1, wherein the organic solvent (C) is used as a mixture of two or more thereof.

6. The resorcinol-formalin resin according to claim 1, wherein after step (12), water is added in an amount of 1 to 10 equivalents by weight to the resorcinol-formalin resin in the organic solvent (C) solution of the resorcinol-formalin resin and the organic solvent (C) is removed by distillation to finally obtain an aqueous resorcinol-formalin resin solution having a reaction product concentration of 30 to 80%.

7. The resorcinol-formalin resin according to claim 1, wherein after step (12), the organic solvent (C) is added to the organic solvent layer obtained by the separation into two layers after allowing to stand and the removal of the aqueous layer, in an amount of 2 to 10 equivalents to the weight of the reaction product to effect dilution, water is removed by distillation at the azeotropic temperature of water and the organic solvent, and then solid matter is removed by filtration after cooling to room temperature.

8. The resorcinol-formalin resin according to claim 1, wherein the organic solvent (C) is methyl ethyl ketone or methyl isobutyl ketone.

9. A process for producing a resorcinol-formalin resin containing no inorganic salts, which comprises:
(1) adding, to a water solvent, resorcinol (A) in an amount of 20 to 150 parts by weight relative to 100 parts by weight of water, an inorganic salt (B) in an amount of 20 to 80 parts by weight relative to 100 parts by weight of water, and an organic solvent (C) having a solubility parameter of 7.0 to 12.5 and capable of dissolving the resorcinol-formalin resin in an amount of 10 to 200 parts by weight relative to 100 parts by weight of resorcinol (A), thereby forming a mixture;
(2) stirring the mixture at a liquid temperature not higher than the boiling point of the organic solvent (C) to give a two-phase system containing no remaining solid matter;
(3) adding a catalytic amount of an organic acid or inorganic acid (D) to the mixture formed in step (2);
(4) adding 1 to 40% formalin (E) dropwise to the mixture formed in step (3) in a molar ratio of formaldehyde/resorcinol of 0.3 to 0.8 under stirring over a period of 1 to 300 minutes thereby forming a reaction system, while maintaining the reaction system at 0 to 60° C.;
(5) stirring the mixture formed in step (4) for further 10 to 60 minutes after the completion of the dropwise addition to cause a liquid-liquid heterogeneous reaction to proceed;
(6) allowing the reaction system to stand while maintaining it at the temperature of the reaction to separate it into two layers, which are an aqueous layer and a reaction product layer;
(7) removing the aqueous layer;
(8) adding an organic solvent (C) in an amount of 1 to 5 equivalents to the amount of the reaction product to the reaction product layer which is an organic solvent layer to effect dilution;
(9) adding water to the reaction product layer in an amount which is half of the amount of the organic solvent;
(10) stirring the reaction system after adding of said organic solvent (C) and said water while maintaining its temperature to be not higher than the boiling point;
(11) separating the reaction system of step (10) into two layers, including an aqueous layer, after allowing the reaction system to stand; and then
(12) removing the aqueous layer to obtain a resorcinol-formalin resin, wherein said reaction is a one-stage reaction and liquid-liquid distribution is conducted in the same reactor, and wherein the organic solvent (C) is an organic solvent represented by the following general formula [1]:

General formula [1]:

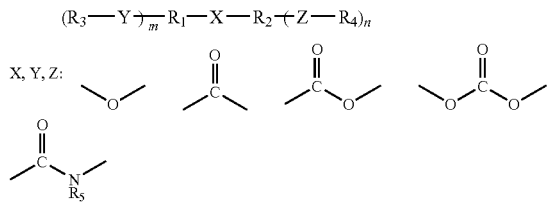

wherein m represents 0 or 1, n represents 0 or 1, and $R_1$, $R_2$, $R_3$, $R_4$, and $R_5$ each independently represents a methyl group, an ethyl group, an n-propyl group, a 2-propyl group, an n-butyl group, a secondary butyl group, an isobutyl group, or a tertiary butyl group; $R_1$ and $R_2$ may be combined to form a ring when $m=n=0$, $R_2$ and $R_3$ may be combined to form a ring when $m=1$ and $n=0$, and $R_3$ and $R_4$ may be combined to form a ring when $m=n=1$, with the proviso that when X is —O— and $m=n=0$, $R_1$ and $R_2$ are combined to form a ring.

10. The process according to claim 9, wherein the 1 to 40% formalin (E) is intermittently added dropwise in a molar ratio of formaldehyde/resorcinol of 0.3 to 0.8 under stirring over a period of 20 to 300 minutes in step (4).

11. The process according to any one of claims 9 to 10, wherein a peak area corresponding to resorcinol pentanuclear or higher nuclear bodies present in said resorcinol-formalin resin is from 30% to 55% relative to the whole peak area and a peak area corresponding to the resorcinol monomer is from 3% to 9% relative to the whole peak area, the peak areas being obtained by gel permeation chromatographic analysis of the resorcinol-formalin resin.

12. The process according to claim 9, wherein the organic solvent (C) is an organic solvent having a solubility parameter of 9.0 to 11.0.

13. The process according to claim 9, wherein the organic solvent (C) is used as a mixture of two or more thereof.

14. The process according to claim 9, wherein the inorganic salt (B) is a salt formed from one or two or more cations selected from alkali metals and alkaline earth metals and one or two or more anions selected from a sulfate ion, a nitrate ion, a chlorine ion, a bromine ion, an iodine ion, and a thiocyanate ion.

15. The process according to claim 9, wherein the inorganic salt (B) is calcium chloride.

16. The process according to claim 9, wherein the amount of the organic solvent (C) added in step (1) is from 30 to 100 parts by weight relative to 100 parts by weight of resorcinol (A).

17. The process according to claim 9, wherein the organic acid or inorganic acid (D) is hydrochloric acid.

18. The process according to claim 9, wherein the mole number of formaldehyde in the formalin (E) relative to the mole number of resorcinol (A) is in a molar ratio of formaldehyde/resorcinol of 0.5 to 0.8.

19. The process according to claim 9, wherein time for the dropwise addition of the formalin (E) is from 20 to 120 minutes.

20. The process according to claim 9, wherein after step (12), water is added in an amount of 1 to 10 equivalents by weight to the resorcinol-formalin resin in the organic solvent (C) solution of the resorcinol-formalin resin and the organic solvent (C) is removed by distillation to finally obtain an aqueous resorcinol-formalin resin solution having a reaction product concentration of 30 to 80%.

21. The process according to claim 9, wherein after step (12), the organic solvent (C) is added to the organic solvent layer obtained by the separation into two layers after allowing to stand and the removal of the aqueous layer, in an amount of 2 to 10 equivalents to the weight of the reaction product to effect dilution, water is removed by distillation at the azeotropic temperature of water and the organic solvent, and then solid matter is removed by filtration after cooling to room temperature.

* * * * *